United States Patent
Chandra et al.

(10) Patent No.: US 8,958,793 B2
(45) Date of Patent: Feb. 17, 2015

(54) METHOD AND APPARATUS FOR MANAGING COMMON MEASUREMENT GAPS IN MULTIMEDIA BROADCAST MULTICAST SERVICE CELLS

(75) Inventors: Arty Chandra, Manhasset Hills, NY (US); Eldad M. Zeira, Huntington, NY (US); Guang Lu, Dollard-des-Ormeaux (CA); Guodong Zhang, Farmingdale, NY (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1859 days.

(21) Appl. No.: 11/863,887

(22) Filed: Sep. 28, 2007

(65) Prior Publication Data

US 2008/0081598 A1    Apr. 3, 2008

Related U.S. Application Data

(60) Provisional application No. 60/827,551, filed on Sep. 29, 2006.

(51) Int. Cl.
*H04W 4/00* (2009.01)
*H04W 36/00* (2009.01)
(Continued)

(52) U.S. Cl.
CPC .............. *H04W 48/12* (2013.01); *H04W 24/10* (2013.01); *H04W 56/004* (2013.01);
(Continued)

(58) Field of Classification Search
CPC ............ H04W 56/0055; H04W 24/10; H04W 36/0016; H04W 48/12; H04W 4/06; H04W 48/16; H04W 72/005; H04W 72/02

USPC ......... 370/312, 343, 345, 347, 350, 252, 331; 455/414.1, 422.1, 434, 466, 515, 574, 455/437
See application file for complete search history.

(56) References Cited

U.S. PATENT DOCUMENTS

| 6,553,064 B1 * | 4/2003 | Chen et al. .................... 375/224 |
| 7,620,061 B2 | 11/2009 | Yi et al. |

(Continued)

FOREIGN PATENT DOCUMENTS

| DE | 2004/039155 | 2/2006 |
| EP | 1 467 586 | 10/2004 |

(Continued)

OTHER PUBLICATIONS

Alcatel et al., "Discussion about E-MBMS on Dedicated Carrier," TSG RAN WG2 Meeting #54, R2-062056 (Aug. 28-Sep. 1, 2006).

(Continued)

*Primary Examiner* — Dwayne Bost
*Assistant Examiner* — Larry Sternbane
(74) *Attorney, Agent, or Firm* — Theodore Naccarella

(57) ABSTRACT

A method and apparatus for managing common measurement gaps in multimedia broadcast multicast services (MBMS) cells are described. In one embodiment, a broadcast channel (BCH) common measurement gap is determined for use by a plurality of wireless transmit/receive units (WTRUs) in an MBMS cell. The BCH common measurement gap is assigned to the WTRUs, and the BCH common measurement gap is transmitted to the WTRUs. In another embodiment, a paging channel (PCH) common measurement gap is determined for use by a plurality of WTRUs in an MBMS cell. The PCH common measurement gap is assigned to the WTRUs, and the PCH common measurement gap is transmitted to the WTRUs.

28 Claims, 4 Drawing Sheets

(51) Int. Cl.
*H04B 7/00* (2006.01)
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04H 20/71* (2008.01)
*H04W 48/12* (2009.01)
*H04W 24/10* (2009.01)
*H04W 56/00* (2009.01)
*H04W 48/16* (2009.01)
*H04W 4/06* (2009.01)
*H04W 72/00* (2009.01)

(52) U.S. Cl.
CPC ..... *H04W 36/0016* (2013.01); *H04W 56/0055* (2013.01); *H04W 48/16* (2013.01); *H04W 4/06* (2013.01); *H04W 72/005* (2013.01)
USPC .......... 455/434; 455/437; 455/515; 370/252; 370/312; 370/331

(56) References Cited

U.S. PATENT DOCUMENTS

| | | | |
|---|---|---|---|
| 2004/0180675 A1 | 9/2004 | Choi et al. | |
| 2004/0229605 A1 | 11/2004 | Hwang et al. | |
| 2005/0020260 A1* | 1/2005 | Jeong et al. | 455/434 |
| 2005/0153715 A1 | 7/2005 | Hwang | |
| 2005/0176474 A1* | 8/2005 | Lee et al. | 455/574 |
| 2005/0232271 A1* | 10/2005 | Kettunen et al. | 370/390 |
| 2007/0183388 A1* | 8/2007 | Breuer et al. | 370/345 |

FOREIGN PATENT DOCUMENTS

| | | |
|---|---|---|
| EP | 1 608 195 | 12/2005 |
| WO | 2005/101681 | 10/2005 |
| WO | 2006/018368 | 2/2006 |

OTHER PUBLICATIONS

Catt, "Paging for LTE Broadcast/Multicast," 3GPP TSG RAN WG2 #54, R2-062376 (Aug. 28-Sep. 1, 2006).
LG Electronics, "Discussion on LTE MCCH," 3GPP TSG-RAN WG2 #54, R2-062434 (Aug. 28-Sep. 1, 2006).
LG Electronics, "Dual Receiver for MBMS," 3GPP TSG-RAN3 Meeting #54, R2-062466 (Aug. 28-Sep. 1, 2006).
Motorola, "Open Issues for LTE Broadcast/Multicast," 3GPP TSG-RAN WG2 LTE AdHoc, R2-061989 (Jun. 27-30, 2006).
Nokia, "MBMS Scenarios," 3GPP TSG-RAN WG2 Meeting #54, R2-062203 (Aug. 28-Sep. 1, 2006).
Samsung, "Reception of the Paging on the MBMS Layer," 3GPP TSG RAN2 #54, R2-062257 (Aug. 28-Sep. 2, 2006).
Siemens, "LTE MBMS," 3GPP TSG-RAN WG RAN2 #53, R2-061429 (May 8-12, 2006).
Siemens, "Measurement Requirements and MBMS Reception in Cell-FACH State," 3GPP TSG RAN WG4 (Radio) Meeting #32, R4-040413 (Aug. 16-20, 2004).
Third Generation Partnership Project, "Technical Specification Group Radio Access Network; Physical Layer Aspects for Evolved Universal Terrestrial Radio Access (UTRA) (Release 7)", 3GPP TR 25.814 V7.1.0 (Sep. 2006).
Third Generation Partnership Project, "Technical Specification Group Radio Access Network; Physical Layer Aspects for Evolved Universal Terrestrial Radio Access (UTRA) (Release 7)", 3GPP TR 25.814 V7.0.0 (Jun. 2006).
Alcatel et al, "Discussion about E-MBMS on Dedicated Carrier," TSG RAN WG2 Meeting #54, R2-062056 (Aug. 28-Sep. 1, 2006).
"European Office Action", EP application No. 07 838 943.4, Oct 2, 2013, 3 pages.
"Taiwanese Office Action", Taiwanese Application No. 099115042, Jul. 30, 2013, 7 pages.
"Taiwanese Office Action (English translation)", Taiwanese Application No. 099115042, Jul. 30, 2013, 4 pages.

* cited by examiner

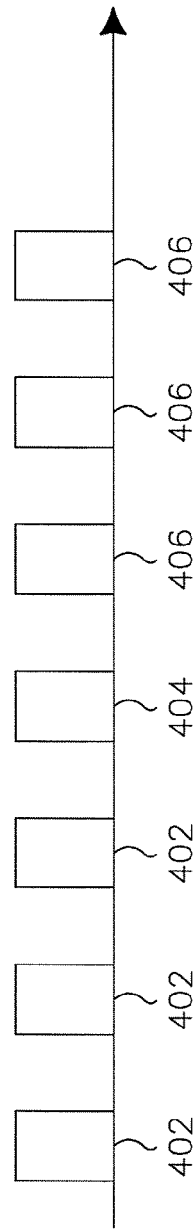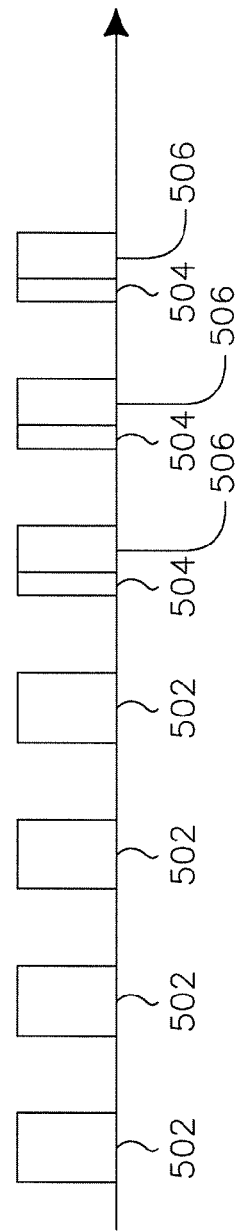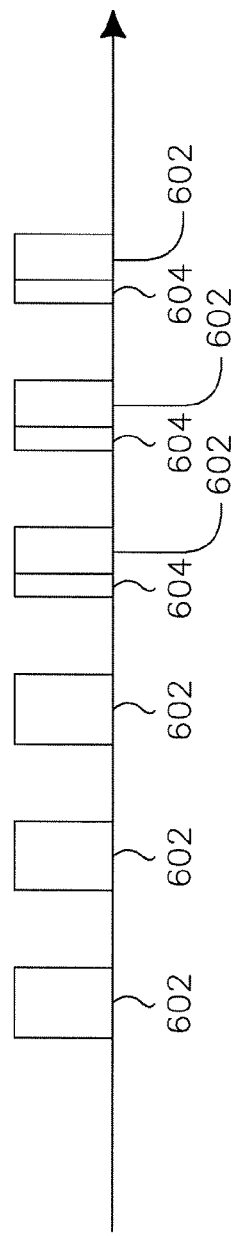

METHOD AND APPARATUS FOR MANAGING COMMON MEASUREMENT GAPS IN MULTIMEDIA BROADCAST MULTICAST SERVICE CELLS

CROSS REFERENCE TO RELATED APPLICATIONS

This application claims the benefit of U.S. provisional application No. 60/827,551, filed Sep. 29, 2006, which is incorporated by reference as if fully set forth.

FIELD OF INVENTION

In general, wireless transmit receive unit (WTRU) operation in a Multimedia Broadcast Multicast Services (MBMS) dedicated cell in an Evolved Universal Terrestrial Radio Access (UTRA) (E-UTRA) systems is disclosed. More particularly, downlink and uplink communication for a WTRU in an MBMS dedicated cell is disclosed.

BACKGROUND

The Third Generation Partnership Project (3GPP) is an industry group working to improve world-wide wireless communication. Its Long Term Evolution (LTE) project is looking to set standards and guidelines to improve wireless communication systems in the near and long-term future. In order to further improve MBMS as an efficient mechanism to reliably distribute multimedia content over E-UTRA networks to subscribers, dedicated MBMS cells are considered in the 3GPP LTE standardization effort. Dedicated MBMS cells are those cells in which only MBMS is supported in the downlink. No uplink unicast services are supported in a dedicated MBMS cell.

Although MBMS architecture is generally supported in the Universal Mobile Telecommunication System (UMTS) release 6, dedicated MBMS cells are not supported. It would be desirable to have a method and apparatus to support WTRU operation for an MBMS dedicated cell that is compliant with UMTS release 6.

SUMMARY

A method and apparatus for wireless communication in a dedicated MBMS cell is disclosed. A WTRU may receive a broadcast channel (BCH) while the WTRU is camped on an MBMS dedicated cell. The BCH preferably includes cell information. WTRUs camped on a particular MBMS dedicated cell may align measurement gaps. The WTRU may receive control frames such that the control frames are piggybacked onto data frames. The WTRU may transmit in an uplink channel in a mixed MBMS cell.

BRIEF DESCRIPTION OF THE DRAWINGS

A more detailed understanding of the invention may be had from the following description of a preferred embodiment, given by way of example and to be understood in conjunction with the accompanying drawings wherein:

FIG. 4 shows a series of data frames and control frames in accordance with another alternative embodiment;

FIG. 5 shows data frames and piggybacked indicator frames in an MBMS signal in accordance with another alternative embodiment; and FIG. 6 shows data frames with piggybacked control frames in an MBMS signal according another alternative embodiment.

DETAILED DESCRIPTION

Figure 1:
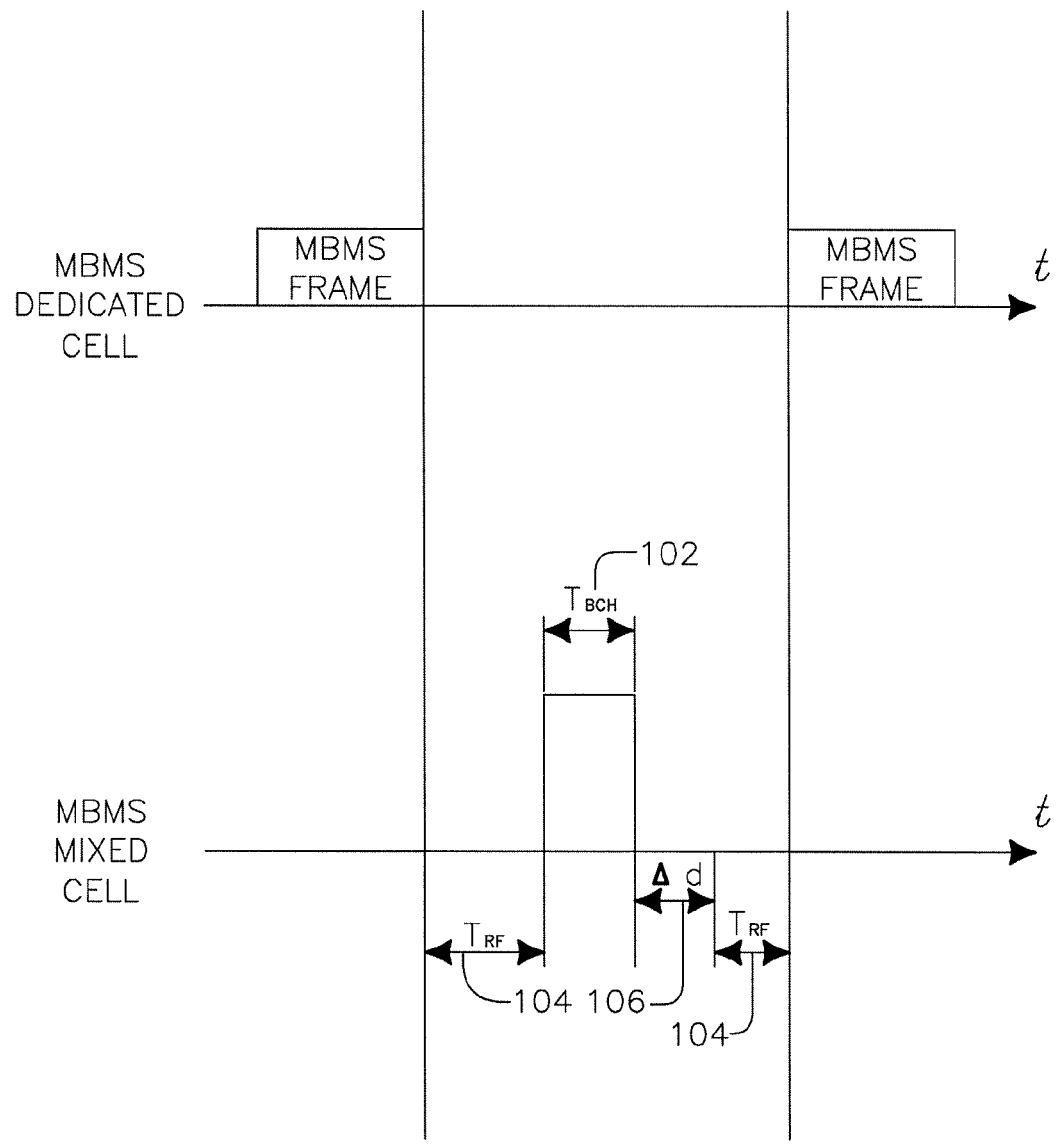
FIG. 1 shows a BCH common measurement gap in accordance with one embodiment.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Single Receiver WTRU

A WTRU may include a single receiver that has bandwidth capability allowing for reception of one MBMS dedicated cell or one MBMS mixed cell at a time. In order that the single receiver WTRU function properly, the WTRU should receive cell specific information from a BCH in an MBMS dedicated cell. The cell specific information may include an indication of the time and frequency positions of the MBMS control channel (MCCH) and carry the MBMS system frame number. The cell specific information may also include an identifier (ID) for single frequency network (SFN) operation.

The BCH in the MBMS dedicated cell may also carry neighboring cell information. This may include, but is not limited to, cells to which the WTRU can transmit non-synchronized random access data and cells from which the WTRU may receive a paging channel if the paging is not transmitted in the MBMS dedicated cell. The neighboring cell information may also include cells to which the WTRU can transmit a paging response and other cell information, such as random access channel (RACH) related information and downlink timing information. The BCH may be combined with the MCCH into one channel.

It is preferable that the paging channel (PCH) is carried in the MBMS dedicated cell in order to reduce measurement and reception gaps and the resulting interruption to MBMS reception. However, it would be preferable that the paging response RACH is sent in an MBMS mixed cell.

In addition to, or instead of, normal paging information, information from other cells may be carried, such as random access channel (RACH) related information and downlink timing information. The information may be sent jointly with information carried on the BCH or sent alone if no RACH and downlink timing related information is carried on the BCH. The information may allow the WTRU to spend a maximum amount of time on MBMS reception, thus minimizing MBMS interruption time and battery consumption.

A paging indicator may be carried as part of the physical paging channel or carried on the MCCH. Furthermore, although the physical PCH may be carried separately from the MCCH, it can also be incorporated into the MCCH.

In order to maintain normal operation in an E-UTRA system, a WTRU preferably performs signal strength measurements on a regular basis. However, typical MBMS dedicated cells do not broadcast the information required for a WTRU to perform proper measurements. Therefore, in order for a WTRU camped on an MBMS dedicated cell to perform these measurements, it preferably retunes its receiver to other cells that are not dedicated MBMS. The measurement may include cell search, reception of the BCH, PCH and paging. The time during which a WTRU is performing measurement is referred to as a measurement gap, although it may be used for measurement and channel reception.

During inter-frequency or inter-radio access technology (RAT) measurement gaps, the WTRU is unable to receive MBMS data from the cell on which the WTRU is camped. Therefore, in order to increase WTRU performance, measurement gaps should be minimized or controlled within a range.

Measurement gaps may be controlled by having all the WTRUs in a cell retune and receive measurements at the same time. A MBMS scheduling entity may obtain frame timing information and BCH timing for neighboring cells. The MBMS scheduling entity may then schedule common measurement gaps for all WTRUs camped on the MBMS dedicated cell so that the WTRUs receive the BCH of a neighboring cell. Although the actual BCH timing for each WTRU will be different, the difference in time is small compared to frame length.

FIG. 1 shows a BCH common measurement gap 100 in accordance with one embodiment. $T_{BCH}$ 102 is the BCH timing at a Node B, and $T_{RF}$ 104 is the time to retune the RF receiver in a WTRU from one carrier to another. $\Delta_d$ 106 denotes the maximum propagation delay, which depends on cell radius. As shown in FIG. 1, the common measurement gap starts at $T_{RF}$ 104 before the BCH at the Node B and ends $\Delta_d$ 106 plus $T_{RF}$ 104 after BCH at the Node B. The Node B sets each WTRU in the cell to use this measurement gap. Basing the measurement gap on the Node B, rather than the individual WTRUs in the cell, creates a BCH common measurement gap 100 that reduces the interruption to MBMS reception at the MBMS dedicated carrier. Other measurements may be used to create common measurement gaps. The measurements include, but are not limited to, downlink synchronization channels and pilot signals in neighboring cells.

Figure 2:
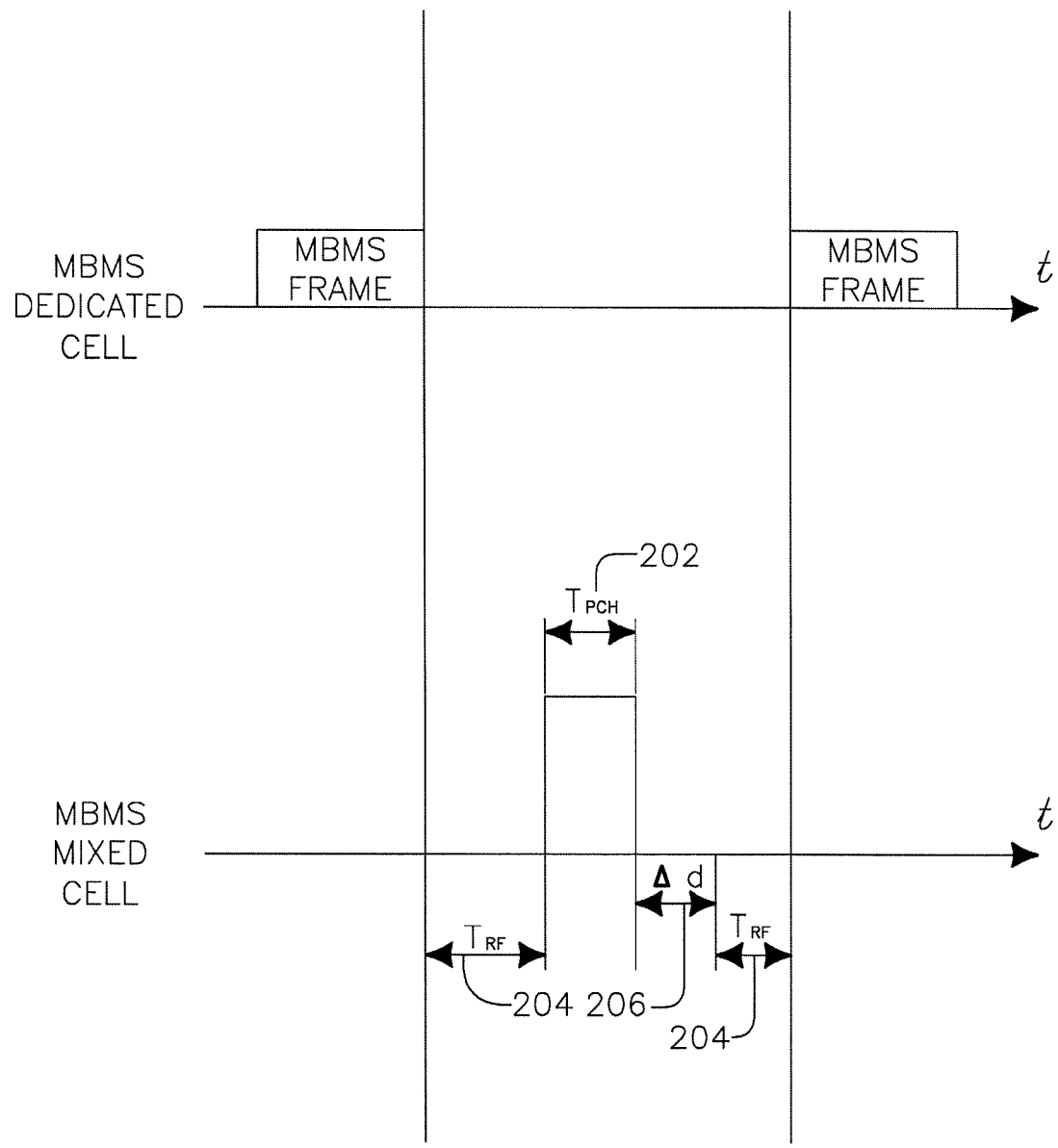
FIG. 2 shows a paging channel (PCH) common measurement gap in accordance with another embodiment.

FIG. 2 shows a paging channel (PCH) common measurement gap 200 in accordance with another embodiment. As shown in FIG. 2, the PCH common measurement gap 200 starts at $T_{RF}$ 204 before the PCH at the Node B and ends $\Delta_d$ 206 plus $T_{RF}$ 204 after PCH at the Node B. The Node B sets each WTRU in the cell to use the PCH common measurement gap 200. Basing the measurement gap on the Node B, rather than the individual WTRUs in the cell, creates a common measurement gap that reduces the interruption to MBMS reception at the MBMS dedicated carrier. A short inter-frequency PCH measurement gap is utilized to minimize the interruption to MBMS reception at the MBMS dedicated carrier.

Figure 3:
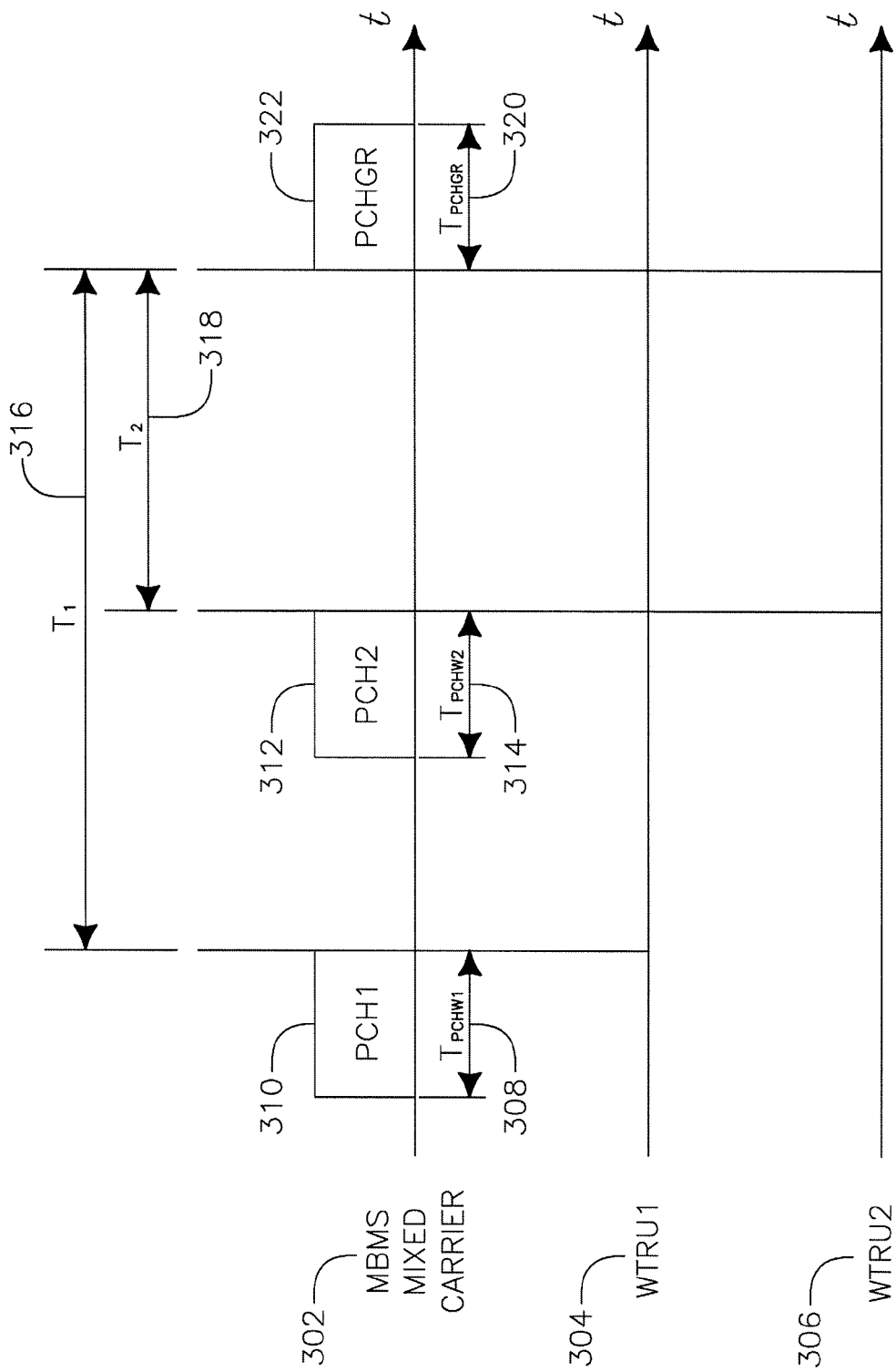
FIG. 3 shows a PCH common measurement gap for discontinuous reception in an MBMS dedicated cell in accordance with an alternative embodiment.

A Node B may adjust the discontinuous reception (DRX) cycle of each WTRU and align wakeup times of all WTRUs that are listening for paging and subscribing to the same MBMS channel. A WTRU may transmit to a non-MBMS Node B its MBMS reception timing information which may include, but is not limited to, the timing for information elements in the BCH, MCCH and a data channel. FIG. 3 shows a PCH common measurement gap for discontinuous reception in an MBMS dedicated cell in accordance with an alternative embodiment. WTRU1 304 and WTRU2 306 both are listening to an MBMS mixed cell 302 in order to receive a PCH for measurement purposes. PCH1 310 for WTRU1 304 is broadcast at time $T_{PCHW1}$ 308. PCH2 312 for WTRU2 304 is at $T_{PCHW2}$ 314. PCH1 310 may be shifted by T1 316 and PCH2 312 may be shifted by time T2 318 so that PCH1 310 and PCH2 312 are both broadcast at $T_{PCHGR}$ 320. The new, single PCH for both WTRU1 304 and WTRU2 306 is now PCHGR 322. The DRX cycle adjustment may be applied to WTRUs that are camped on MBMS mixed cells.

DRX periods may be grouped by the network. The channel to which the WTRU is listening in the dedicated cell preferably is known or transmitted to the network, so that the network may schedule the DRX period of the WTRU such that it will not overlap its dedicated cell MBMS channel and related control transmission times.

A WTRU may make measurements while camped in a dedicated MBMS cell without the use of a prespecified measurement gap. Although an MBMS dedicated cell may be transmitting continuously, many channels are transmitted periodically. Therefore, the transmission time of any one channel may be short. A WTRU may listen to at least one or, alternatively, a small number of channels. Therefore, the WTRU may listen during the transmission time of these channels as well as during the transmission times of channels used to carry scheduling and other control information necessary in the MBMS dedicated cell. For a WTRU camped on an MBMS dedicated cell, inter-frequency measurements of a synchronization channel, the BCH, and downlink pilot signals may be performed while the WTRU is not listening to its MBMS channels. No measurement gap may be necessary Paging may be scheduled in a pseudo-random manner that is known to both a WTRU and a network. Due to the pseudo-random nature of the schedule, it is probable that overlap events will be independent. An overlap event occurs when the paging time for a WTRU overlaps with the transmission time for its MBMS channel. A WTRU may give priority to MBMS transmissions, which may result in some paging loss. Alternatively, the WTRU may give priority to the paging, which may result in some loss of the MBMS signal. A determination of how priority is distributed may be performed by the WTRU, the network, or by a predetermined or dynamic rule. Alternatively, the MBMS may be scheduled in semi-random manner regardless of the paging. Whichever signal is given priority, when switching to the mixed cell for the paging, the WTRU may listen for a paging indicator channel, the paging channel, or both.

A WTRU camped on an MBMS dedicated cell preferably transmits in the uplink of the appropriate MBMS mixed cell when the WTRU has uplink data to transmit and when the WTRU needs to respond to paging. The WTRU also may transmit in the uplink when the WTRU has feedback for MBMS and when the WTRU performs a UTRAN registration area (URA) update. In the URA, the WTRU may include information such as system frame number ID, MBMS dedicated cell ID, MBMS timing information, and the like.

For uplink transmissions, the WTRU may use a non-synchronized random access channel in an MBMS mixed cell. If the PCH is not carried in the MBMS dedicated cell, the WTRU may continuously perform a non-initial cell search to acquire any downlink timing of neighboring cells.

A WTRU may acquire RACH information from continuous reading of the BCH of the MBMS mixed cell. The WTRU can then access the uplink of the MBMS mixed cell immediately. This is achieved at the cost of long measurement gaps.

A WTRU may acquire RACH related information through the BCH and/or PCH of the MBMS dedicated cell. The WTRU may also access the uplink of the MBMS mixed cell immediately. This is achieved at the potential cost of large BCH and PCH payloads in the MBMS dedicated cell.

A WTRU may acquire RACH related information of neighboring MBMS mixed cell only after it is paged. The measurement gaps may be minimized but at a potential cost of a large delay in uplink transmission.

A WTRU may start to acquire RACH related information of a neighboring MBMS mixed cell at a proper time before it listens for a PCH. The WTRU knows its DRX cycle. If the WTRU is paged, then RACH related information has already been obtained and RACH transmission can be performed immediately. The measurement gaps may be minimized without a large delay in uplink transmission.

Dual Receiver WTRU

A WTRU may have a dual receiver. Dual receiver capability may allow the WTRU to receive an MBMS dedicated carrier and a mixed carrier at the same time. A WTRU with a dual receiver can camp on both carriers. Dual receiver capability may also allow the WTRU to transmit while receiving MBMS data. The WTRU capabilities may be known by a network through signaling. If the WTRU is incapable of dual reception or transmission with simultaneous reception, an E-UTRA network may use MBMS dedicated timing information similar to the timing information used for a single receiver unit, in order to schedule downlink events that generate RACH accesses in order to minimize MBMS interruption. RF power consumption and measurement gap control may be balanced, however.

A dual receiver configuration also allows the WTRU flexibility in terms of measurement gap control. However, this comes at a cost of a more expensive receiver and higher RF power consumption. The trade-off between the number or length of measurement gaps and RF power consumption may, however, be balanced.

In order to maintain proper MBMS reception, a threshold may be set for a number of sub-frames that may be allocated for measurement gaps. One receiver remains active as long as a number of measurement gaps are less than the threshold. Therefore, it is preferable that the PCH is carried in the MBMS dedicated carrier because it does not require the receiver to retune, which is time-consuming. When the number of required measurement gaps exceeds the threshold, the second receiver is turned on to perform the measurements.

MBMS control information in separate control frames may be transmitted with data over the MBMS traffic channel (MTCH). To differentiate control and data, an indication frame may be included. This frame can be short and may contain an indication that the next few frames are control frames and a number of control frames following the indication. Alternatively, control information may be piggybacked with data frames.

FIG. 4 shows a series of data frames and control frames in accordance with another alternative embodiment. MBMS data frames 402 are broadcast in the MTCH. Following the MBMS data frames 402 is a control indicator frame 404 that indicates that the frame following the indicator frame 404 is a control frame. MBMS control frames 406 follow the indicator frame 404.

FIG. 5 shows data frames and piggybacked indicator frames in an MBMS signal in accordance with another alternative embodiment. MBMS data frames 502 are broadcast in the MTCH. A control indicator 504 is piggybacked onto a control frame 506. The control indicator 504 indicates that the frame on which the control indicator 504 is piggybacked is an MBMS control frame 504.

FIG. 6 shows data frames with piggybacked control frames in an MBMS signal according another alternative embodiment. MBMS data frames 602 are broadcast in the MTCH. An MBMS control frame 604 is piggybacked onto an MBMS data frame 602. No control indicator is broadcast in the signal. The broadcast control channel (BCCH) should indicate to the WTRU to decode the data frames over MTCH for MBMS control information.

The MBMS control information sent over the MTCH may contain MBMS service notification, MBMS scheduling information, MBMS critical and non-critical change information, and/or an MBMS service ID.

The BCCH in the MBMS cell may carry information regarding where the WTRU should listen for MBMS control and data. The BCCH may contain an indication to monitor MTCH only for MBMS control information if there is no separate MBMS control channel in the cell and an indication to monitor MTCH for MBMS control information after a WTRU starts to receive MBMS data when MCCH is also used for initial MBMS control information, such as notification. The BCCH may also contain am MBMS service ID if various MBMS services are carried differently.

A WTRU may only need to get the information from BCCH when it camps on the cell. Once the WTRU joins the MBMS service, the MBMS control information preferably is carried over MTCH or MCCH. This method may reduce WTRU battery consumption as the WTRU does not need to frequently monitor control channels. This method may also decrease the transmission frequency of MCCH.

Although the features and elements are described in the preferred embodiments in particular combinations, each feature or element can be used alone without the other features and elements of the preferred embodiments or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A network node, comprising:
   a processor configured to determine a broadcast channel (BCH) common measurement gap for use by a plurality of wireless transmit receive units (WTRUs) in a multimedia broadcast multicast services (MBMS) cell; and
   a transmitter configured to schedule the BCH common measurement gap for the WTRUs, wherein the BCH common measurement gap comprises a first time period sufficient to permit each of the WTRUs to retune a receiver in the WTRU from one carrier to another, a second time period synchronized to BCH timing at a network node, a third time period corresponding to a maximum propagation delay, and a fourth time period sufficient to permit each of the WTRUs to retune the receiver in the WTRU from one carrier to another;

wherein the first time period, the second time period, the third time period, and the fourth time period are consecutive.

2. The network node as in claim 1, wherein the processor is further configured to adjust a discontinuous reception (DRX) period of the WTRUs.

3. The network node as in claim 1, wherein the processor is further configured to perform a priority distribution for scheduling a paging.

4. The network node as in claim 1, wherein the network node is a base station.

5. The network node as in claim 1, wherein the network node is a radio network controller (RNC).

6. The network node as in claim 1, wherein the processor is further configured to schedule a discontinuous reception (DRX) period so that a dedicated cell MBMS channel and related transmission timing do not overlap.

7. The network node of claim 1 wherein the second time period is equal to the BCH timing at the network node.

8. A method of managing common measurement gaps, the method comprising:
    determining a broadcast channel (BCH) common measurement gap for use by a plurality of wireless transmit receive units (WTRUs) in a multimedia broadcast multicast services (MBMS) cell; and
    scheduling the BCH common measurement gap for the WTRUs, wherein the BCH common measurement gap comprises a first time period sufficient to permit each of the WTRUs to retune a receiver in the WTRU from one carrier to another, a second time period synchronized to BCH timing at a network node, a third time period corresponding to a maximum propagation delay, and a fourth time period sufficient to permit each of the WTRUs to retune the receiver in the WTRU from one carrier to another;
    wherein the first time period, the second time period, the third time period, and the fourth time period are consecutive.

9. The method as in claim 8, further comprising:
    adjusting a discontinuous reception (DRX) period of the WTRUs.

10. The method as in claim 8, further comprising:
    performing a priority distribution for scheduling a paging.

11. The method as in claim 8, further comprising:
    scheduling a discontinuous reception (DRX) period so that a dedicated cell MBMS channel and related transmission timing do not overlap.

12. The method as in claim 8, wherein the network node is a base station.

13. The method as in claim 8, wherein the network node is a radio network controller (RNC).

14. The method of claim 8 wherein the second time period is equal to the BCH timing at the network node.

15. A network node, comprising:
    a processor configured to determine a paging channel (PCH) common measurement gap for use by a plurality of wireless transmit receive units (WTRUs) in a multimedia broadcast multicast services (MBMS) cell; and
    a transmitter configured to schedule the PCH common measurement gap for the WTRUs, wherein the PCH common measurement gap comprises a first time period sufficient to permit each of the WTRUs to retune a receiver in the WTRU from one carrier to another, a second time period synchronized to PCH timing at a network node, a third time period corresponding to a maximum propagation delay, and a fourth time period sufficient to permit each of the WTRUs to retune the receiver in the WTRU from one carrier to another;
    wherein the first time period, the second time period, the third time period, and the fourth time period are consecutive.

16. The network node as in claim 15, wherein the processor is further configured to adjust a discontinuous reception (DRX) period of the WTRUs.

17. The network node as in claim 15, wherein the processor is further configured to perform a priority distribution for scheduling a paging.

18. The network node as in claim 15, wherein the network node is a base station.

19. The network node as in claim 15, wherein the network node is a radio network controller (RNC).

20. The network node as in claim 15, wherein the processor is further configured to schedule a discontinuous reception (DRX) period so that a dedicated cell MBMS channel and related transmission timing do not overlap.

21. The network node of claim 15 wherein the second time period is equal to the BCH timing at the network node.

22. A method of managing common measurement gaps, the method comprising:
    determining a paging channel (PCH) common measurement gap for use by a plurality of wireless transmit receive units (WTRUs) in a multimedia broadcast multicast services (MBMS) cell; and
    scheduling the PCH common measurement gap for the WTRUs, wherein the PCH common measurement gap comprises a first time period sufficient to permit each of the WTRUs to retune a receiver in the WTRU from one carrier to another, a second time period synchronized to PCH timing at a network node, a third time period corresponding to a maximum propagation delay, and a fourth time period sufficient to permit each of the WTRUs to retune the receiver in the WTRU from one carrier to another;
    wherein the first time period, the second time period, the third time period, and the fourth time period are consecutive.

23. The method as in claim 22, further comprising:
    adjusting a discontinuous reception (DRX) period of the WTRUs.

24. The method as in claim 22, further comprising:
    performing a priority distribution for scheduling a paging.

25. The method as in claim 22, further comprising:
    scheduling a discontinuous reception (DRX) period so that a dedicated cell MBMS channel and related transmission timing do not overlap.

26. The method as in claim 22, wherein the network node is a base station.

27. The method as in claim 22, wherein the network node is a radio network controller (RNC).

28. The method of claim 22 wherein the second time period is equal to the BCH timing at the network node.

* * * * *